United States Patent
Lin

(10) Patent No.: US 6,590,910 B2
(45) Date of Patent: Jul. 8, 2003

(54) ACTIVELY MODE-LOCKED FIBER LASER WITH CONTROLLED CHIRP OUTPUT

(75) Inventor: Hong Lin, Palo Alto, CA (US)

(73) Assignee: Calmar Optcom, Inc., Sunnyvale, CA (US)

( * ) Notice: Subject to any disclaimer, the term of this patent is extended or adjusted under 35 U.S.C. 154(b) by 0 days.

(21) Appl. No.: 09/969,124

(22) Filed: Sep. 24, 2001

(65) Prior Publication Data

US 2002/0071454 A1 Jun. 13, 2002

Related U.S. Application Data

(60) Provisional application No. 60/234,570, filed on Sep. 22, 2000.

(51) Int. Cl.$^7$ ................................................. H01S 3/098
(52) U.S. Cl. .......................... 372/18; 372/26; 372/12
(58) Field of Search ...................... 372/18, 20; 385/27, 385/37; 356/350

(56) References Cited

U.S. PATENT DOCUMENTS

| | | | | |
|---|---|---|---|---|
| 5,381,426 A | * | 1/1995 | Fontana et al. | 372/18 |
| 5,469,257 A | * | 11/1995 | Blake et al. | 356/350 |
| 5,570,438 A | * | 10/1996 | Fontana et al. | 385/24 |
| 5,574,739 A | * | 11/1996 | Carruthers et al. | 372/29 |
| 5,590,142 A | * | 12/1996 | Shan | 372/18 |
| 5,646,774 A | * | 7/1997 | Takara et al. | 359/340 |
| 5,828,680 A | * | 10/1998 | Kim et al. | 372/18 |
| 5,835,199 A | * | 11/1998 | Phillips et al. | 356/5.03 |
| 5,887,093 A | * | 3/1999 | Hansen et al. | 385/27 |
| 5,911,015 A | * | 6/1999 | Bigo | 385/1 |
| 5,956,355 A | * | 9/1999 | Swansom et al. | 372/20 |
| 6,262,828 B1 | * | 7/2001 | Akiyama et al. | 359/237 |
| 6,266,457 B1 | * | 7/2001 | Jacob | 385/11 |
| 6,330,383 B1 | * | 12/2001 | Cai et al. | 385/37 |

FOREIGN PATENT DOCUMENTS

EP     1 030 472     8/2000

OTHER PUBLICATIONS

Bakhshi et al. "Pulse chirp control in an actively mod-elocked fibre laser using a dual–drive variable–chirp modulator." Electronic Letters, Feb. 17, 2000, vol. 36, No. 4, pp. 325–327.

T. Carruthers, I. Duling III, M. Horowitz, and C. Menyuk; Dispersion management in a harmonically mode–locked fiber soliton laser; Optic Letters, vol. 25, No. 3, Feb. 01, 2000.

N. Smith, N. Doran, F. Knox, and W. Forysiak; Energy–scaling characteristics of solitons in strongly dispersion–managed fibers; Optical Society of America 1996.

M. Horowitz, C. Menyuk, T. Carruthers and I. Duling; Pulse dropout in harmonically mode–locked fiber lasers; IEEE Photonics Technology Letters, vol. 12, No. 3, Mar. 2000.

V. Grigoryan, T. Golovchenko, C. Menyuk, and A. Pilipetskii; Dispersion–managed soliton dynamics; Optical Society of America 1997.

N. Bergano, C. Davidson, C. Chen, B. Pederson, M. Mills, N. Ramanujam, H. Kidorf, A. Puc, M. Levonas, and H. Abdelkader; 640 Gb/s Transmission of sixty–four 10 Gb/s WDM channels over 7200km with .33 (bit/s)Hz spectral Efficiency; Tyco Submarine Systems, Ltd., NJ.

(List continued on next page.)

*Primary Examiner*—Paul Ip
*Assistant Examiner*—Phillip Nguyen
(74) *Attorney, Agent, or Firm*—Fish & Richardson P.C.

(57) ABSTRACT

Mode-locked fiber lasers with an active feedback control of the frequency chirp and a mechanism for adjusting the dispersion of the output pulses.

24 Claims, 3 Drawing Sheets

OTHER PUBLICATIONS

T. Carruthers, M. Dennis, I. Duling, M. Horowitz, and C. Menyuk; Enhanced stability of a dispersion–managed, harmonically mode–locked fiber laser; Tuesday Morning, May 25, 1999; CLEO 1999, 11:00am.

M. Horowitz, C. Menyuk, T. Carruthers, and I. Duling; Dispersion management in an actively modelocked fiber laser with Kerr nonlinearity; Tuesday Morning, May 25, 1999; CLEO 1999, 11:15am.

* cited by examiner

ACTIVELY MODE-LOCKED FIBER LASER WITH CONTROLLED CHIRP OUTPUT

This application claims the benefit of U.S. Provisional Application No. 60/234,570 entitled "Actively Mode-Locked Fiber Laser with Controlled Chirp Output" and filed on Sep. 22, 2000.

BACKGROUND

This application relates to fiber lasers, and in particular, to actively mode-locked fiber lasers.

A fiber laser may use one or more optical fiber segments to form an optical resonator. At least one portion of the fiber in the resonator is doped with active ions (e.g., Er ions) to form the laser gain medium for producing the optical gain for the laser oscillation in the resonator when optically pumped by light at a pump wavelength. The fiber laser generally produces a laser beam at a laser wavelength longer than the pump wavelength.

Pulsed fiber lasers are of particular interest in many applications, such as optical fiber communication systems. A mode locking mechanism may be implemented in a fiber laser to lock multiple laser modes for producing laser pulses when the resonator supports multiple laser modes. This mode locking may be either active or passive. In active mode locking, the intracavity optical field is modulated at a frequency equal to one or a multiplicity of the mode spacing. In passive mode locking, at least one nonlinear optical element is placed inside the laser cavity to produce an intensity-dependent response to an optical pulse so that the pulse width of the optical pulse exiting the nonlinear element is reduced.

SUMMARY

This application discloses mode-locked fiber lasers where the optical dispersion within the optical resonator is managed to control the frequency chirp characteristics and pulse shape of output laser pulses. The frequency chirp and pulse shape may be controlled in a way to negate adverse effects on the optical pulses such as dispersion caused by transmission through a fiber link and hence increase the transmission distance of the optical pulses without pulse reconditioning by an optical relay device in the fiber link.

DETAILED DESCRIPTION

Figure 1:
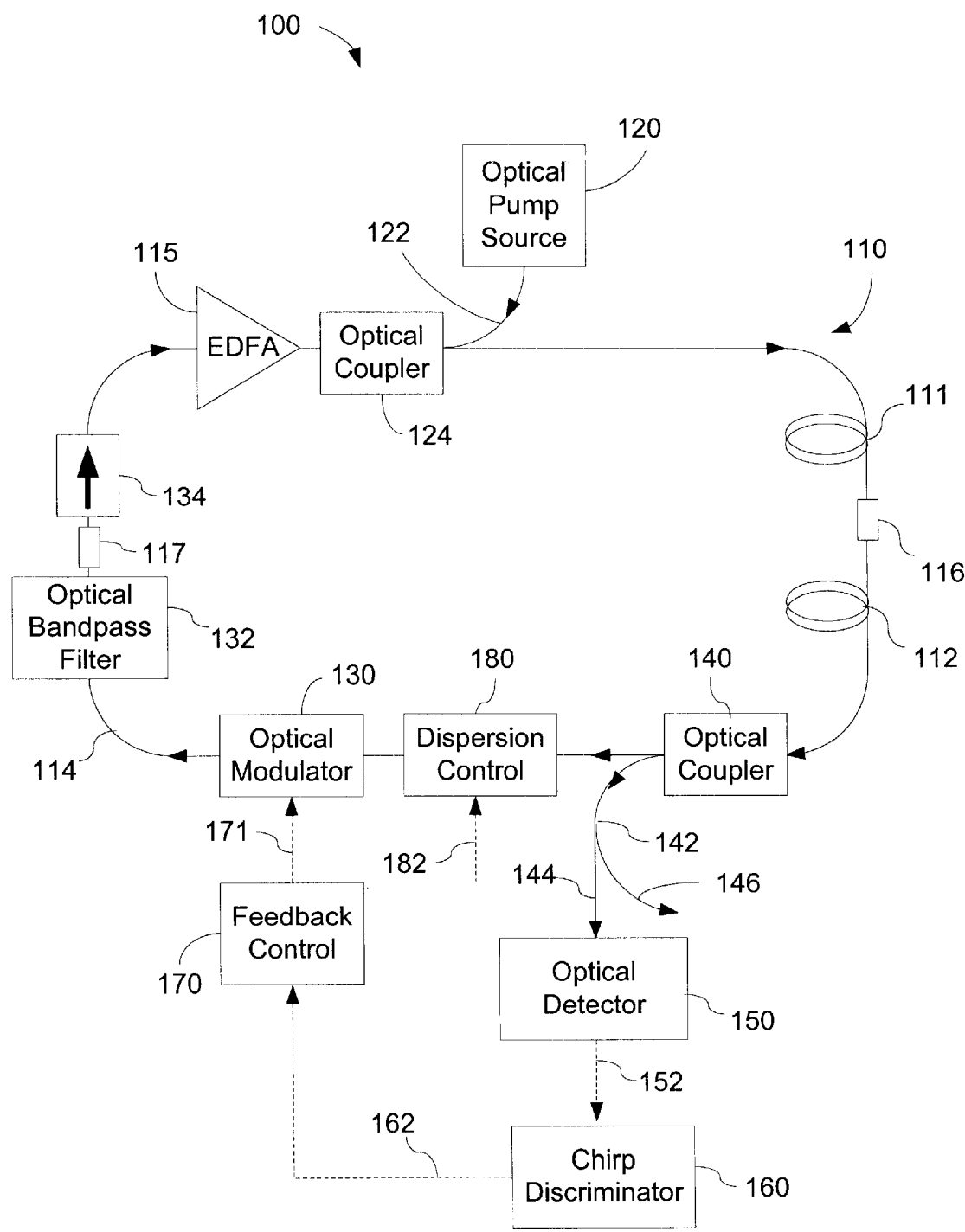
FIGS. 1 and 2 show two embodiments of actively mode-locked fiber ring lasers according, where solid arrowed lines represent optical paths and dashed arrowed lines represent non-optical signal paths.

Optical fibers, like many other optical materials, exhibit various dispersion effects to varying degrees. One dispersion effect is the chromatic dispersion where the light at one wavelength experiences a refractive index different from the refractive index of light at another wavelength. Hence, the group velocities of optical waves at different wavelengths are somewhat different in the same fiber even if other properties of the optical waves being equal (e.g., the same polarization). Another dispersion effect is the polarization-mode dispersion (PMD) caused by optical birefringence of the fiber where the fiber exhibits different refractive indices along two orthogonal principal axes of polarization that are substantially perpendicular to the fiber.

One of consequences of the chromatic dispersion is distortion or broadening of an optical pulse during propagation because different spectral components of the pulse travel at different group velocities. Similarly, the PMD can also cause pulse distortion or broadening. Such dispersion effects are adverse to the performance of the fiber systems because they can degrade the quality of the signals carried by optical pulses and may even cause loss of information. Hence, to ensure fidelity of the information transmitted through optical pulses over fibers, the transmission distance is often limited by these dispersion effects in fibers. Dispersion effects are becoming increasingly problematic as optical pulses are made shorter and denser to increase the transmission capacity of each fiber link. One way to obviate this aspect of the dispersion effects is to deploy pulse regenerators along a fiber link to regenerate the optical pulses that are either restored to the original pulse shapes or sufficiently restored to retain the information in the original pulses. The regenerated pulses are then sent down the fiber link towards the desired destination.

The use of pulse regenerators presents a number of issues in fiber systems. For example, the pulse regenerators increase the initial cost of the fiber systems. A pulse regenerator may malfunction or even fail. This can lead to the failure of the fiber link. Therefore, it is desirable to increase the transmission distance of optical pulses in fibers and to reduce the number of pulse generators in a fiber link.

One aspect of the techniques and devices of this application is to chirp the optical frequency of each optical pulse generated from an actively mode-locked fiber laser so that the chirped optical pulse has a particular chromatic dispersion profile and becomes less prone to pulse broadening or distortion by the chromatic dispersion or nonlinear effects of the fiber compared to a un-chirped pulse. More specifically, an adjustable chirping mechanism is implemented in the actively mode-locked fiber laser to monitor the frequency chirp of each output pulse and to control or maintain the frequency chirp at a desired frequency chirp profile by correcting any error in the chirp through a feedback control loop.

Notably, the above adjustable chirping mechanism may be at least in part achieved by actively managing the total chromatic dispersion of the output pulses of the fiber laser. In one embodiment, the optical fiber path within the resonator of the fiber laser is designed to include two fiber segments that exhibit chromatic dispersions with opposite signs. At a position in the fiber path of the resonator, the local dispersion may not be small or canceled out and may even be significantly large. However, the total chromatic dispersion can be controlled at a desired value or substantially eliminated. In implementation, a fiber coupler is disposed at a selected location in the resonator with positive and negative dispersion segments to output pulses with the desired dispersion. An adjustable dispersion control unit may be placed either within the resonator or outside the resonator to adjust the dispersion of the output pulses in response to a dispersion control signal. The active control is implemented by an active feedback loop that dynamically adjusts the phase in modulating the optical energy within the resonator to correct any deviation from the desired frequency chirp of the output pulses.

The active mode locking is implemented by modulating a property of the optical beam in the resonator at a modulation frequency set by a modulation control signal. The modulation may be designed to modulate either the amplitude or the phase of the optical beam in the resonator. In particular, both the phase and the amplitude of the optical beam in the resonator may be modulated at the same time, e.g., by placing a phase modulator and an amplitude modulator in the resonator. The phase modulation produces a phase variation across each pulse and hence effectuates a frequency chirp to the pulse. The phase modulation can be controlled by the aforementioned feedback control loop to adjust the phase modulation to lock the frequency chirp at a desired frequency chirp profile.

Several embodiments of actively mode-locked fiber lasers are described in detail in the following to illustrate the above and other features of the present application.

FIG. 1 shows one embodiment of an actively mode-locked fiber laser 100 that uses fiber segments 111, 112, 114, and 115 to form a closed fiber ring or loop 110. This fiber ring 110 constitutes the optical resonator of the fiber laser 100. Polarization-maintaining single-mode ("PM") fibers or polarizing single-mode fibers may be used to maintain the polarization and hence mitigate the polarization drift effects due to, e.g., environmental conditions. A PM fiber is configured to have well-defined principal axes for two mutually orthogonal polarizations. A polarizing fiber has a single principal polarization axis. These two types of fibers can be configured so that a principal axis is essentially not influenced by environmental conditions, such as fiber position, temperature, and stress. Therefore, the polarization of a beam propagating in such a fiber can be maintained. In the following description, "polarization-maintaining fiber" fiber will be used to include any fiber or optical waveguide that can preserve an optical polarization of a beam.

The fiber segment 115 is doped with active ions as an optical amplifier to produce the desired optical gain for the laser oscillation when optically pumped by light 122 at a pump wavelength from an optical pump source 120. An optical coupler 124, such as a fiber coupler, is used to couple the pump light 122 to the fiber amplifier 115 in a direction which may be in the opposite direction of the laser beam in the ring resonator 110. The optical coupler 124 may be wavelength selective to couple only light at the pump wavelength without significantly affecting light at the laser wavelength in the ring resonator 110. When the optical gain in the segment 115 exceeds the total optical loss in the entire ring resonator 110, laser oscillation can be generated. Many different dopants can be used to achieve laser oscillations at different wavelengths. For example, atomic transitions in rare-earth ions, such as erbium, holmium, neodymium, samarium, thulium and ytterbium, can be used to produce lasers from visible wavelengths to far infrared wavelengths (e.g., from 0.45 to about 3.5 microns). Er-doped fiber lasers for producing optical pulses at 1.55 micron are particularly useful for optical fiber communication since the optical loss in the commonly used silica fibers is minimum at about 1.55 micron under optical pumping at 980 nm or 1480 nm. Two or more different rare-earth ions can be mixed together to achieve certain pump and laser wavelengths that may not be readily available from a single doping element.

The ring resonator 110 may include an optical bandpass filter 132 to select only the desired laser wavelength to circulate by suppressing light at other wavelengths. An optical isolator 134 may also be placed in the ring resonator 110 to ensure the uni-directional propagation of the laser beam.

An optical coupler 140, e.g., a fiber coupler, is used to split a portion of the laser power in the laser resonator 110 to produce an output. Another optical coupler 142 may be used to further split the output into a beam 146 as the output of the laser 100 and a monitor beam 144 for monitoring the properties of the laser pulses.

The ring resonator 110 is designed to support multiple longitudinal modes that oscillate simultaneously. An optical modulator 130 is placed in the resonator 110 to synchronize the phases of different modes in such a way that the phase difference between any two adjacent modes is locked at a constant. These phase-locked modes constructively add to one another to produce a short pulse. The optical modulator 130 is controlled by a modulation control signal 171 to modulate the light at a modulation frequency in a desired spectral range. For many applications, the modulation frequency may be in the RF range, e.g., tens of GHz such as 10 GHz or 40 GHz in some applications. One exemplary implementation of such a modulator is an electro-optic modulator based on the electro-optic effect or an acousto-optic modulator. A $LiNbO_3$ crystal or other electro-optic material may be used. The modulator may be in the Mach-Zehnder configuration.

The fiber laser 100 includes two dispersion management mechanisms to control the total dispersion in the output laser pulses. The first mechanism is to design the optical path in the resonator 110 to have at least two fiber portions that exhibit chromatic dispersions with opposite signs. The fiber segment 111, for example, is designed to have a positive chromatic dispersion and the fiber segment 112 has a negative dispersion. Fiber connectors 116 and 117 connect the fiber segments 111 and 112 to form the fiber ring. The fiber amplifier 115 may be part of the fiber segment 111 with the positive dispersion. The length and magnitude of the chromatic dispersions of the fiber segments 111 and 112 are predetermined in the design of the laser 100 to achieve a desired, fixed total frequency chirp in the output pulses. For example, the fiber segments 111 and 112 may be designed to have the same amount of chromatic dispersion with opposite signs so that the total dispersion-caused frequency chirp at the middle location of the optical path length of either of the fiber segments 111 and 112 is substantially cancelled out or near zero. The output fiber coupler 140 is strategically placed at a selected location in the resonator 110 so that the output optical pulses have a dispersion to produce a chirp close to the desired chirp. This selection of the position of the output coupler 140 in the fiber ring 110 is based on the analysis of dispersion managed soliton effects. See, Grigoryan et al., "Dispersion-Managed Soliton Dynamics," Optics Letters, Vol. 22, pp. 1609–1611(1997); Smith et al., "Energy-Scaling characteristics of Solitons in Strongly Dispersion-Managed Fibers," Optics Letters, Vol. 21(24), pp. 1981–1983 (1998); Carruthers et al., "Dispersion Management in A Harmonically Mode-Locked Fiber Soliton Laser," Optics Letters, Vol. 25(3), pp.153–155 (2000); and Horowitz et al., "Pulse Dropout in Harmonically Mode-Locked Fiber Lasers," IEEE Photonics Technology Letters, Vol. 12(3), pp.266–268 (2000).

In many applications where the output pulses of the fiber laser transmit through an optical fiber link, the output pulses may be controlled to have a desired positive total chirp to negate the adverse nonlinear optical effects in the fiber link. Assuming the fiber segment 111 has the positive dispersion and the fiber segment 112 has the negative dispersion, the above condition may be achieved by placing the output coupler 140 at a selected location in the fiber portion that includes connector 116 and is located between the middle location of the fiber segment 111 and the middle location of the fiber segment 112. If a negative frequency chirp were desired in the output pulses for an application, the output coupler 140 would be disposed at a selected location in the fiber portion that includes connector 117 and is located between the middle location of the fiber segment 112 and the middle location of the fiber segment 111.

The fiber laser 100 also includes an adjustable dispersion control unit 180 that varies the chromatic dispersion of the output pulses produced by the segments 111, 112, and the location of the output coupler 140 in response to a dispersion control signal 182. This unit 180 hence adjusts the frequency chirp in the output pulses. A tunable fiber grating coupled with an optical circulator may be used as the dispersion control unit 180 to receive the laser beam and modify the dispersion of the received laser beam (e.g., a linearly or nonlinearly chirped grating). In another example, a reflective grating with a fiber pigtail may also be used. Hence, the unit 180 can be adjusted to modify the fixed total dispersion determined by the fiber segments 111 and 112 to meet specific requirements of different applications.

The above fixed and adjustable dispersion mechanisms may be used in combination to achieve various total dispersions and hence frequency chirps in the output pulses. For example, the overall dispersion in the fiber ring 110 may be minimized to shorten the pulse width. For another example, the group velocity dispersion may be adjusted to cancel out the effect of the self-phase modulation in the fiber resonator 110 to produce optical solitons.

The frequency chirp and the pulse shape of the output pulses of the fiber laser 100 are dynamically controlled and adjusted on a even finer scale by an active feedback loop in part formed by an optical detector 150, a chirp discriminator 160, and a feedback control unit 170. The detector 150 converts the output beam 144 into a detector signal 152. The chirp discriminator 160 receives and processes the signal 152 to determine the difference between the actual frequency chirp of the output pulses and a desired frequency chirp. This process produces an error signal 162 that represents the chirp error. The feedback control 170 converts the error signal 162 into a modulation control signal 171 to the modulator 130. The modulator 130 operates to change the phase across each pulse to reduce the chirp error. As a result, the chirp of each pulse is locked to the desired chirp. The desired frequency chirp supplied to the chirp discriminator 160 may be an adjustable parameter so that the feedback loop can lock the output frequency chirp at different desired values for different applications.

Notably, the dispersion control signal 182 may be independent from the modulation control signal 171 and hence the dispersion control unit 180 provides a variable "DC" bias to the total dispersion and thus the frequency chirp of the output pulses initially set by the location of the output coupler 140. The feedback loop then provides an "AC" adjustment to the frequency chirp of the output pulses to dynamically lock the output frequency chirp at the desired frequency chirp.

Figure 2:
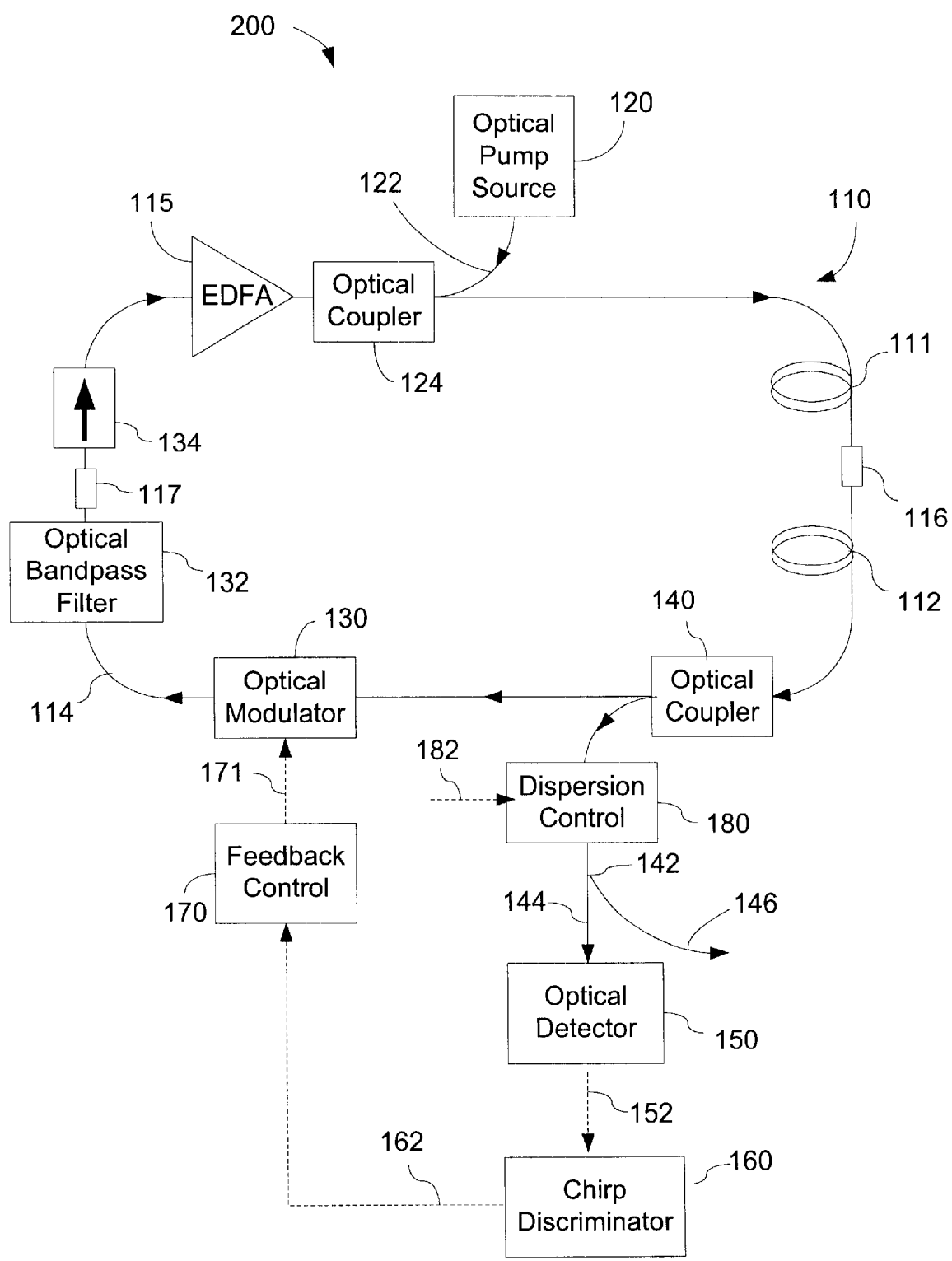

FIG. 2 shows another fiber ring laser 200 in which the dispersion control 180 is outside the ring resonator 110. Hence, the total chromatic dispersion of the ring resonator 110 is fixed by the design the fiber segments 111 and 112. The final dispersion in the output pulses is controlled by adjusting the dispersion unit 180.

Figure 3:
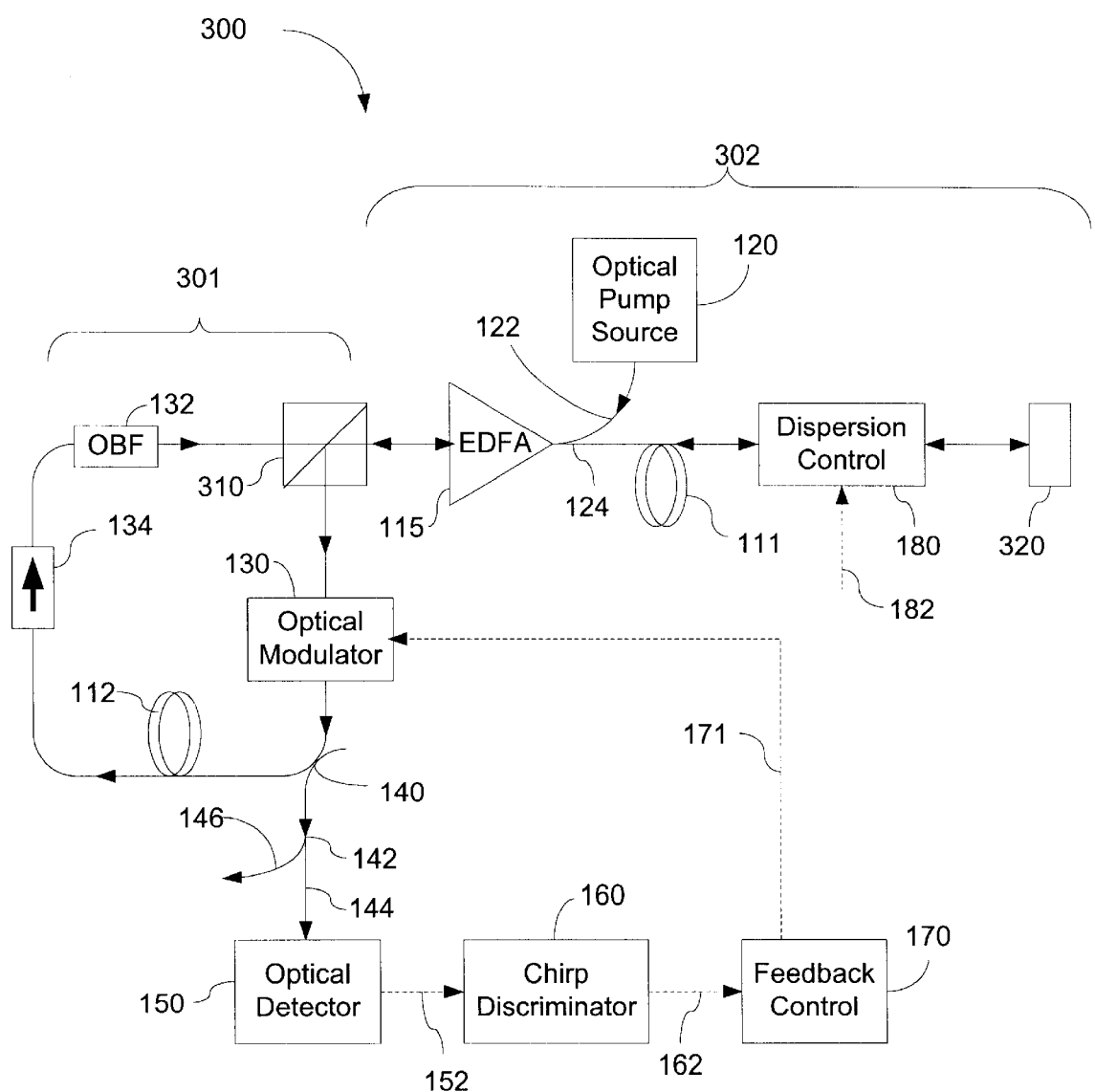
FIG. 3 shows another embodiment of a fiber laser with a different resonator design.

The above chirp control and dispersion management may be implemented in fiber lasers with resonator configurations different from a ring resonator. FIG. 3 shows a polarization-stabilized fiber mode-locked laser 300. See, U.S. Pat. No. 5,574,739. The laser cavity includes a fiber ring portion 301 formed of a single-mode PM fiber and a second dispersion controlled fiber portion 302 also formed of a single-mode fiber. The fiber ring part 301 includes the modulator 130, the optical isolator 134, and the output coupler 140. Two terminals of the fiber ring 301 are coupled to two facets of a polarizing beam splitter 310 to form a ring. The polarization selection by the PBS 310 keeps only one polarization in the laser resonator and rejects the other orthogonal polarization. In addition, the PBS 310 is used as an interface between the two fiber parts 301 and 302 by directing light from one end of the fiber part 302 into the ring part 301 and back to the fiber part 302 after the light circulates the ring 201. The other end of the fiber 1130 is terminated at a Faraday rotator mirror 320 which reflects light with a 90-degree rotation in polarization.

A portion of the second fiber part 302 may be doped as the optical gain medium or fiber amplifier 115 to emit and amplify light at the laser wavelength under optical pumping from the source 120. The fiber segments 111 and 112 with opposite dispersions may be placed in the fiber ring part 301 and the dispersion control part 302, respectively. The adjustable dispersion control 180 is shown to be in the part 302. Alternatively, the control 180 may be outside the resonator in the downstream of the output from the coupler 140 as illustrated in FIG. 2.

In the laser 300, laser light starts from the gain section 115 to be reflected by the Faraday rotator mirror 320 and is amplified again before reaching the beam splitter 310. Light in one polarization is selected to be reflected into the fiber ring part 301 by the beam splitter 310 and is fed back to the gain section 115 after being modulated by the modulator 130 and passing through the beam splitter 310. Light in the other polarization is suppressed.

However the laser resonator is designed, the present application provides three levels of control over the frequency chirp in the output pulses of a fiber laser. First, the location of the output coupler 140 in the resonator formed of two fiber segments 111 and 112 determines the initial and fixed frequency chirp in the output pulses. The location of the output coupler 140 may be determined based on the dispersion-managed soliton principles. Second, the operation of the dispersion control unit 180, either in or outside the laser resonator, provides an adjustable DC bias to the output frequency chirp. The adjustment to the dispersion control unit 180 is determined by the specific requirement on the frequency chirp of a particular application. The adjustment is application specific but is not dynamic. Third, the feedback loop in controlling the phase modulation in the laser resonator is used to provide the dynamic control over the output frequency chirp. The control is also application specific and dynamically corrects any deviation from the desired frequency chirp in response to the chirp error. The control loop is variable in the sense that the locking frequency chirp may be varied so that the output frequency chirp can locked at any desired value within the operating range.

When such a fiber laser is deployed in a particular fiber link within a fiber system, the dispersion control unit 180 may be adjusted to bias the frequency chirp of the output pulses that best optimizes the transmission performance in that fiber link according to the knowledge or measured dispersion characteristics of the fiber link. The feedback loop is turned to dynamically lock the frequency chirp. If, however, the dispersion characteristics of the fiber link changes, the dispersion control unit 180 may be adjusted again to a new bias in the frequency chirp of the output pulses that best optimizes the transmission performance. In another application, when the fiber laser is removed from one fiber link and connected to another fiber link, the dispersion control unit 180 may be adjusted to bias the frequency chirp of the output pulses to a different value that best optimizes the transmission performance for the new fiber link. Hence, a fiber laser with the above chirp control mechanisms can be adapted to different applications without changing its hardware.

Only a few embodiments are disclosed. However, it is understood that variations and enhancements may be made without departing from the spirit of and are intended to be encompassed by the following claims.

What is claimed is:

1. A device, comprising:
    a fiber ring to circulate optical energy, said fiber ring having a first fiber portion and a second fiber portion that have opposite signs in chromatic dispersion;
    a fiber gain portion in said fiber ring which is responsive to optical pumping by light at a pump wavelength to produce an optical gain at a laser wavelength different from said pump wavelength;
    a dispersion control unit in said fiber ring to modify a dispersion of an optical pulse in said fiber ring in response to a dispersion control signal;
    an optical modulator in said fiber ring responsive to a modulator control signal to modulate a property of said optical pulse at a modulation frequency to lock different optical modes in said fiber ring; and
    an output coupler in said fiber ring to couple a portion of optical energy at said laser wavelength to produce a pulsed laser output.

2. The device as in claim 1, further comprising:
    an optical detector coupled to receive a portion of said pulsed laser output to produce a detector signal;
    a chirp circuit coupled to said optical detector to process said detector signal to determine a difference between a frequency chirp of said pulsed laser output and a desired frequency chirp and to produce a chirp-error signal; and
    a feedback circuit coupled to said chirp circuit to produce said modulator control signal according to said chirp-error signal for reducing said difference.

3. The device as in claim 1, wherein said property includes an optical phase.

4. The device as in claim 1, wherein said property includes an optical amplitude.

5. The device as in claim 1, wherein said property includes both an optical phase and an optical amplitude.

6. The device as in claim 1, wherein said optical modulator includes an amplitude modulator that modulates an amplitude of said optical pulse and a phase modulator that modulates a phase of said optical pulse.

7. The device as in claim 1, wherein said dispersion control unit includes a reflective optical grating.

8. The device as in claim 1, wherein said fiber ring is polarization maintaining.

9. The device as in claim 1, wherein chromatic dispersions of said first and said second fiber portions and said dispersion control unit are balanced to produce optical solitons in said pulsed laser output.

10. The device as in claim 1, further comprising a feedback control loop that produces said modulator control signal to control said frequency chirp of each pulse in response to a measurement of said pulsed laser output.

11. A device, comprising:
    a fiber ring to circulate optical energy, said fiber ring having a first fiber portion and a second fiber portion that have opposite signs in chromatic dispersion;
    a fiber gain portion in said fiber ring which is responsive to optical pumping by light at a pump wavelength to produce an optical gain at a laser wavelength different from said pump wavelength;
    an optical modulator in said fiber ring responsive to a modulator control signal to modulate a property of said optical pulse at a modulation frequency to lock different optical modes in said fiber ring;
    an output coupler in said fiber ring to couple a portion of optical energy at said laser wavelength to produce a pulsed laser output; and
    a dispersion control unit in a path of said pulsed laser output to modify a dispersion of said pulsed laser output in response to a dispersion control signal to bias a frequency chirp of each pulse in said pulsed laser output to a desired fixed value.

12. The device as in claim 11, further comprising a feedback control loop that produces said modulator control signal to control said frequency chirp of each pulse in response to a measurement of said pulsed laser output.

13. The device as in claim 12, wherein said feedback loop includes:
    an optical detector coupled to receive a portion of said pulsed laser output passing through said dispersion control unit to produce a detector signal;
    a chirp circuit coupled to said optical detector to process said detector signal to determine a difference between a frequency chirp of said pulsed laser output and a desired frequency chirp and to produce a chirp-error signal; and
    a feedback circuit coupled to said chirp circuit to produce said modulator control signal according to said chirp-error signal for reducing said difference.

14. The device as in claim 11, wherein said property includes an optical phase.

15. The device as in claim 11, wherein said property includes an optical amplitude.

16. The device as in claim 11, wherein said property includes both an optical phase and an optical amplitude.

17. The device as in claim 11, wherein said dispersion control unit includes a reflective optical grating.

18. The device as in claim 11, wherein said fiber ring is polarization maintaining.

19. The device as in claim 11, wherein chromatic dispersions of said first and said second fiber portions and said dispersion control unit are balanced to produce optical solitons in said pulsed laser output.

20. A device, comprising:
    a polarizing beam splitter (PBS);
    a polarization-maintaining fiber loop having an input terminal coupled to one facet of said PBS to receive light in a selected polarization reflected from said PBS and an output terminal coupled to another facet of said PBS to output light in said selected polarization that transmits through said PBS;
    an optical isolator in said fiber loop to circulate said light directing from said input terminal to said output terminal and to suppress light in directing from said output terminal to said input terminal;
    a fiber segment having a first terminal and a second terminal, said first terminal coupled to said PBS to receive light from said output terminal of said fiber loop and to deliver light to said PBS a portion of which is reflected by said PBS into said input terminal of said fiber loop;
    a Faraday rotator reflector coupled to said second terminal to reflect light with a rotation of polarization by about 90 degrees, wherein said fiber ring, said fiber segment, and said Faraday rotator reflector form a laser resonator;

a fiber gain portion in said fiber segment which is responsive to optical pumping by light at a pump wavelength to produce an optical gain at a laser wavelength different from said pump wavelength;

an optical modulator in said fiber loop responsive to a modulator control signal to modulate a property of said light at a modulation frequency to lock different modes in said laser resonator to produce laser pulses, wherein said fiber loop has a sign of dispersion that is opposite to a sign of dispersion in an optical path between said Faraday rotator reflector and said PBS, said fiber ring having a first fiber portion and a second fiber portion that have opposite signs in chromatic dispersion;

an output coupler in said laser resonator to couple a portion of optical energy at said laser wavelength to produce a pulsed laser output; and a dispersion control unit in said fiber segment to modify a dispersion of light in said laser resonator in response to a dispersion control signal to control a frequency chirp of said pulsed laser output.

21. The device as in claim 20, further comprising a feedback control loop that produces said modulator control signal to control said frequency chirp in response to a measurement of said pulsed laser output.

22. The device as in claim 21, wherein said feedback loop includes:

an optical detector coupled to receive a portion of said pulsed laser output passing through said dispersion control unit to produce a detector signal;

a chirp circuit coupled to said optical detector to process said detector signal to determine a difference between a frequency chirp of said pulsed laser output and a desired frequency chirp and to produce a chirp-error signal; and a feedback circuit coupled to said chirp circuit to produce said modulator control signal according to said chirp-error signal for reducing said difference.

23. The device as in claim 20, wherein a chromatic dispersion of said fiber loop and a chromatic dispersion of said optical path between said Faraday rotator reflector and said PBS are balanced to produce optical solitons in said pulsed laser output.

24. A method, comprising;

causing a location of an optical coupler to be selected in an optical path within a mode-locked fiber laser to produce output pulses with a frequency chirp, wherein the optical path within the fiber laser includes a first fiber portion and a second fiber portion that have opposite signs in chromatic dispersion;

causing an adjustable dispersion unit in the optical path within the fiber laser to be adjusted to modify a chromatic dispersion in the output pulses to bias the frequency chirp of the output pulses near a desired frequency chirp; and causing a phase of an optical modulation on optical energy in the fiber laser to be dynamically adjusted in response to a measured frequency chirp of the output pulses to reduce a deviation of the measured frequency chirp from the desired frequency chirp.

* * * * *